(12) United States Patent
Eggert et al.

(10) Patent No.: US 7,162,117 B2
(45) Date of Patent: Jan. 9, 2007

(54) PIEZO-ELECTRIC APPARATUS FOR ACTING ON AN OPTICAL PATH

(76) Inventors: Rainer Eggert, Wolfacherweg 9, 71034 Boblingen (DE); Wolfgang Reichert, Oberer Wengertweg 33, 71134 Aidlingen (DE)

( * ) Notice: Subject to any disclaimer, the term of this patent is extended or adjusted under 35 U.S.C. 154(b) by 0 days.

(21) Appl. No.: 10/500,594

(22) PCT Filed: Jan. 22, 2002

(86) PCT No.: PCT/EP02/00581

§ 371 (c)(1),
(2), (4) Date: Feb. 11, 2005

(87) PCT Pub. No.: WO03/062898

PCT Pub. Date: Jul. 21, 2003

(65) Prior Publication Data

US 2005/0129354 A1    Jun. 16, 2005

(51) Int. Cl.
*G02B 6/26* (2006.01)
*G02B 26/08* (2006.01)

(52) U.S. Cl. .................................. 385/19; 359/298
(58) Field of Classification Search ............. None
See application file for complete search history.

(56) References Cited

U.S. PATENT DOCUMENTS

2002/0114058 A1* 8/2002 DeReus et al. ............. 359/298

FOREIGN PATENT DOCUMENTS

DE        198 34 761        3/2000

OTHER PUBLICATIONS

Bücker, et al., "Piezoelectric Actuators For Dynamical Applications", SPIE, vol. 3329, 1998, pp. 550-561.

* cited by examiner

*Primary Examiner*—Sung Pak
*Assistant Examiner*—Hoang Tran

(57) ABSTRACT

An apparatus for acting on an optical path, includes an at least partly opaque lever, and a bearance fulcrum about which at least a part of the lever is slewable at least partly in and out of the optical path by the use of a piezo-electric force.

10 Claims, 1 Drawing Sheet

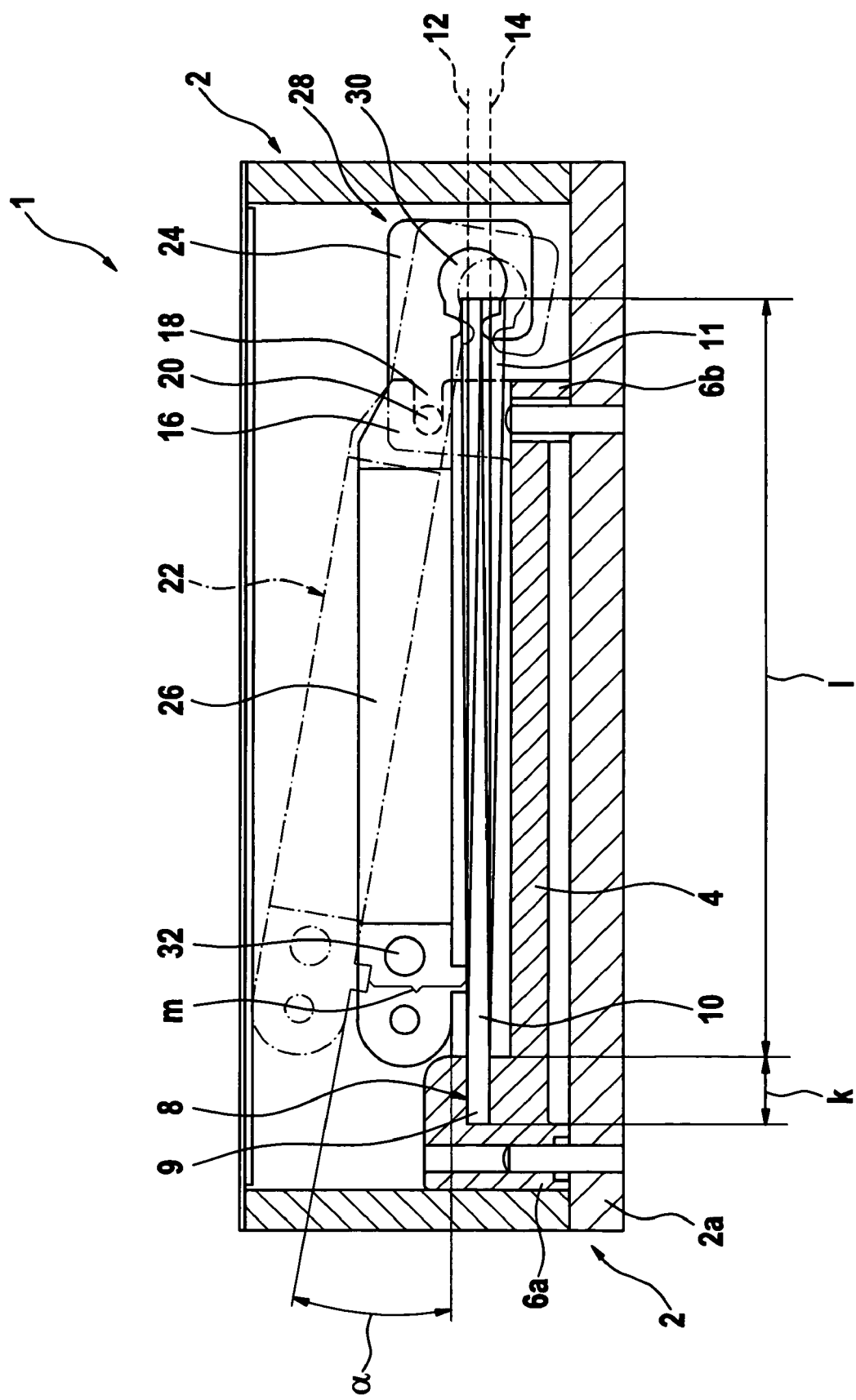

PIEZO-ELECTRIC APPARATUS FOR ACTING ON AN OPTICAL PATH

This application is the National Stage of International Application No. PCT/EP02/00581, International Filing Date, Jan. 22, 2002, which designated the United States of America, and which international application was published under PCT Article 21(2) as WO Publication No. WO 03/062898 A1.

BACKGROUND OF THE INVENTION

When using optical signals traveling an optical path it is often necessary to interrupt or damp the optical signal. Therefore, the prior art provides so-called shutters to at least partly block an optical path, thereby interrupting or damping the optical signal traveling the path. These known shutters are moved by electromagnetic forces.

SUMMARY OF THE INVENTION

It is an object of the invention to provide improved acting on an optical path of an optical signal.

The object is solved by the independent claim.

An advantage of the present invention is that the use of the lever effect makes it possible to use piezo-electric forces for moving the lever to provide a shutter suitable for the demands of optical devices. So far, piezo-electric forces, e.g. provided by a piezo-electric element, were not able to provide a sufficient tilting angle of the piezo-electric element when using piezo-electric elements the size of which can be accepted for a shutter to be used in optical devices. i.e. elements having sufficient tilting angle were to big to be integrated in optical devices and elements having the desired compactness were not able to provide a sufficient tilting angle.

Moreover, the use of piezo-electric forces does not only shrink the size of the shutter but does also shrink the amount of energy necessary to move the lever used as a shutting element of a shutter according to the invention compared to the electromagnetic energy used in the prior art for moving a shutter.

In a preferred embodiment of the invention there is provided a piezo-electric element to exert the piezo-electric force on one end of the lever. By using such an element and by letting it act on the end of the lever it is possible to use the advantages of piezo-electric forces as described above and simultaneously enhance the stroke of the lever.

Preferably, the lever comprises a first lever arm on one side of the fulcrum and a second lever arm on the other side of the fulcrum, the piezo-electric element being connected to an end of the first lever arm remote of the fulcrum. Thereby, the effect of the enhancement of the stroke of the lever is maximized.

In another preferred embodiment the end of the lever being connected to one end of the piezo-electric element which is slewable whereas another end of the piezo-electric element is fixed relative to the apparatus. This also maximizes the stroke of the lever.

In a further preferred embodiment the end of the piezo-electric element being at least partly articulated in a seat in the first lever arm. Thereby, it is possible to provide a little play of the end of the element in the lever to further enhance the lever action caused by the piezo-electric element.

It is further preferred to provide two catches as a lever stop and being positioned to be able to separable lock the lever at least partly in and out of the optical path. Thereby, with each single activation of the piezo-electric element the lever changes its position. Therefore, the lever arrangement is a bistable system and the lever has always a known and defined position making the work of an accordingly constructed shutter more predictable.

Other preferred embodiments are shown by the dependent claims.

It is clear that the invention can be partly embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawing. The components in the drawing are not necessarily to scale, emphasis instead being placed upon clearly illustrating the principles of the present invention.

FIG. 1 shows a cross section of an embodiment of the present invention.

DETAILED DESCRIPTION OF THE INVENTION

FIG. 1 shows a cross section of a shutter 1 according to an embodiment of the present invention. Shutter 1 has a housing 2. Mounted in the housing 2 is an elongated mounting plate 4 having two stands 6a and 6b connected with a base plate 2a of the housing 2. A groove 8 is provided in the left stand 6a. In the groove 8 there is clamped an end 9 of a bimorph type piezo-electric plate 10 connected to a not shown voltage supply. The other end 11 of the plate 10 is freely slewable. The free length l of the piezoelectric plate is 28.4 mm. The clamped length k of the plate is 2.5 mm. By changing the voltage applied to the plate 10 the position of the plate 10 can be changed from the position having the center line 12 to the position having the center line 14 by using the piezo-electric characteristic of the piezo-electric plate 10. Alternatively, the bimorph type piezo-electric plate 10 can be supported or replaced by a multilayer bender actuator (not shown), e.g. a multilayer bender piezoelectric translator actuator of the PL series of Physik Instrumente (PI) GmbH&Co, Auf der Roemerstrasse, D-76228 Karlsruhe/Palmbach.

A stay 16 is extending from the mounting plate 4 opposite to the stand 6b. Stay 16 has a recess 18 providing a bedding for an arbor 20. Connected to the arbor 20 is a rod 22 of opaque and non reflective material. The arbor 20 provides a bearance fulcrum for the rod 22, thereby arbor 20 and rod 22 constitute a lever arrangement with the rod being a lever. The lever 22 has a first lever arm 24 on one side (on the right in FIG. 1) of the fulcrum 20 and a second lever arm 26 on the other side (on the left in FIG. 1) of the fulcrum 20. The piezo-electric plate 10 is connected to an end 28 of the first lever arm 24 remote of the fulcrum 20. The end 11 of the piezo-electric plate 10 is articulated in a seat 30 provided in the first lever arm 24.

Activating the piezo-electric force of the plate 10 the plate 10 bends down from the position with center line 12 into position with center line 14. Since the plate 10 is seated with its end 11 in the seat 30 of the first lever arm 24 the plate pulls down the first lever arm 24 thereby slewing and rising the second lever arm 26 from a position shutting an optical path 32 and shown with solid lines about an angle α=10° into a position opening the optical path 32 and shown with dotted lines.

With the free length l=28.4 mm a stroke m of 3 mm can be provided by the shown shutter 1. Therefore, optical signals, e.g,. laser beams, having a core thickness 32 of up to 1.5 mm and a corresponding diffuse thickness of up to 3 mm can be interrupted completely.

The shutter 1 further comprises a not shown measuring device for measuring the stewing angle α of the lever 22 by a not shown wire-strain gauge bonded to the piezo-electric plate 10, a not shown comparator connected with the measuring device for comparing the measured value of the slewing angle α with a predetermined value of the slewing angle α, and a not shown controller connected with the piezo-electric plate 10 for adjusting the piezo-electric force provided by the piezo-electric plate 10 when the comparator has detected a difference between the measured value and the predetermined value of the stewing angle α.

Two not shown catches are positioned to be able to separable lock the second lever arm 26 at least partly in and out of the optical path 32. The piezo-electric force of the piezo-electric plate 10 is strong enough to release the lever 22 from each catch and to switch the lever 22 between the two catches.

What is claimed is:

1. An apparatus for acting on an optical path, comprising:
   an at least partly opaque or non-transmissive lever;
   a bearance fulcrum about which at least a part of the lever is slewable at least partly in and out of the optical path by the use of a piezo-electric force; and
   a piezo-electric element to exert the piezo-electric force on one end of the lever,
   wherein the lever comprises a first lever arm on one side of the fulcrum and a second lever arm on the other side of the fulcrum,
   the piezo-electric element being connected to an end of the first lever arm remote of the fulcrum.

2. The apparatus of claim 1, wherein the piezo-electric element comprises an end being a least partly articulated in a seat in the first lever arm.

3. The apparatus of claim 1, wherein the piezo-electric element being of bimorph type.

4. The apparatus of claim 1, wherein the end of the lever being connected to one end of the piezo-electric element which is slewable whereas another end of the piezo-electric element is fixed relative to the apparatus.

5. The apparatus of claim 1, wherein at least a part of the second lever arm serves as the part of the lever slewable at least partly in and out of the optical path.

6. The apparatus of claim 1, further comprising at least one catch in which the lever can be separable locked in at least one predetermined position.

7. The apparatus of claim 6, wherein two catches being positioned to be able to separable lock the lever at least partly in and out of the optical path.

8. The apparatus of claim 7, wherein the piezo-electric force of the piezo-electric element being strong enough to release the lever from each catch and to switch the lever between the two catches.

9. The apparatus of claim 1, further comprising:
   a measuring device for measuring the slewing angle (a) of the lever,
   a comparator connected with the measuring device for comparing the measured value of the slewing angle (a) with a predetermined value of the slewing angle (a), and
   a controller connected with the piezo-electric element for adjusting the piezo-electric force when the comparator has detected a difference between the measured value and the predetermined value of the slewing angle (a).

10. The apparatus of claim 9, wherein the measuring device comprises a wire-strain gauge bonded to the piezo-electric element.

* * * * *